(12) United States Patent
Sambonsugi

(10) Patent No.: US 9,307,168 B2
(45) Date of Patent: Apr. 5, 2016

(54) IMAGE CAPTURE APPARATUS AND METHOD FOR CONTROLLING IMAGE CAPTURE APPARATUS IN WHICH DEFECTIVE PIXELS ARE INDICATED

(71) Applicant: CANON KABUSHIKI KAISHA, Tokyo (JP)

(72) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/857,444

(22) Filed: Apr. 5, 2013

(65) Prior Publication Data

US 2013/0271629 A1    Oct. 17, 2013

(30) Foreign Application Priority Data

Apr. 11, 2012 (JP) .................................. 2012-090365

(51) Int. Cl.
*H04N 5/367* (2011.01)
*H04N 5/232* (2006.01)

(52) U.S. Cl.
CPC ............... *H04N 5/367* (2013.01); *H04N 5/232* (2013.01); *H04N 5/23212* (2013.01)

(58) Field of Classification Search
CPC .... H04N 5/23212; H04N 5/232; H04N 5/367
USPC ......................................... 348/246, 243–245
See application file for complete search history.

(56) References Cited

U.S. PATENT DOCUMENTS

| | | | | |
|---|---|---|---|---|
| 2002/0105579 A1* | 8/2002 | Levine | ................. | H04N 5/2176 348/187 |
| 2003/0063202 A1* | 4/2003 | Toyoda | ................. | H04N 5/3675 348/246 |
| 2003/0151682 A1* | 8/2003 | Kokubo | ............... | H04N 5/3675 348/241 |
| 2005/0078204 A1* | 4/2005 | Matsuoka | ............ | H04N 5/3675 348/247 |
| 2007/0165112 A1* | 7/2007 | Shinmei | ................. | H04N 5/357 348/222.1 |
| 2008/0049125 A1* | 2/2008 | Subbotin | .............. | H04N 5/3675 348/241 |
| 2008/0074534 A1* | 3/2008 | Kusaka | .............. | H04N 5/23212 348/364 |
| 2009/0310849 A1* | 12/2009 | Katou | .................. | H04N 5/3675 382/149 |
| 2010/0007777 A1* | 1/2010 | Walter | ................... | H04N 5/367 348/247 |
| 2010/0277625 A1* | 11/2010 | Utsugi | ................... | H04N 9/045 348/246 |
| 2013/0250154 A1* | 9/2013 | Hirose | ............... | H04N 5/23212 348/311 |

FOREIGN PATENT DOCUMENTS

| | | |
|---|---|---|
| CN | 1426238 A | 6/2003 |
| CN | 1719877 A | 1/2006 |
| CN | 101946519 A | 1/2011 |
| CN | 102246079 A | 11/2011 |
| JP | 2004-015191 A | 1/2004 |
| JP | 2011044820 A * | 3/2011 |

* cited by examiner

*Primary Examiner* — Nicholas Giles
*Assistant Examiner* — Abdelaaziz Tissire
(74) *Attorney, Agent, or Firm* — Canon USA, Inc. I.P. Division

(57) ABSTRACT

An image capture apparatus includes an image sensor in which a plurality of types of pixels including a specific pixel is arranged, and a detection unit configured to detect a defective pixel based on a pixel value of each pixel in the image sensor, wherein the detection unit is configured to exclude the specific pixel from a target of the defective pixel based on information indicating a position of the specific pixel in the image sensor.

15 Claims, 20 Drawing Sheets

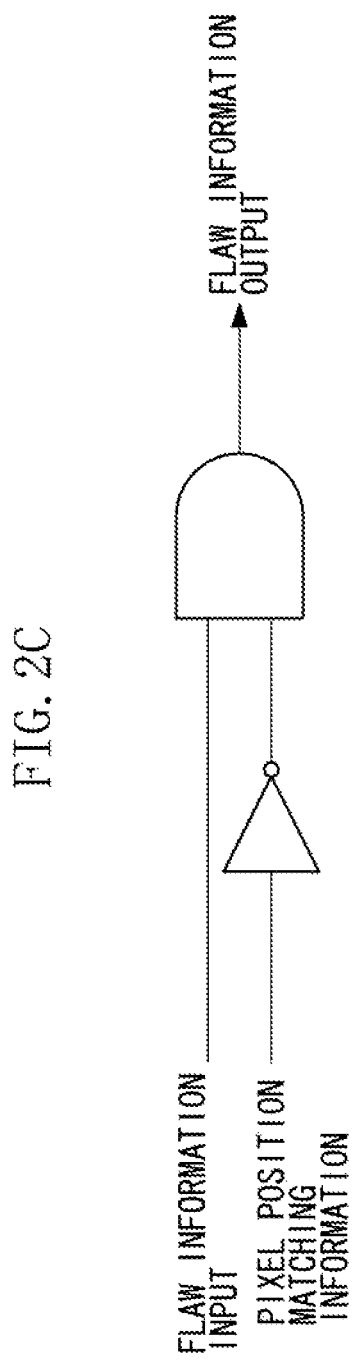

FIG. 3A

| (m−1-TH LINE) | A1 | A2 | A3 |
|---|---|---|---|
| (m-TH LINE) | A4 | A5 | A6 |
| (m+1-TH LINE) | A7 | A8 | A9 |

FIG. 3B

FLAW INFORMATION OUTPUT FROM FLAW DETECTION UNIT

| 0 | 0 | 0 | 0 | 0 | 0 | 0 | 0 |
|---|---|---|---|---|---|---|---|
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |

PIXEL POSITION MATCHING INFORMATION OUTPUT FROM PIXEL POSITION MATCHING CIRCUIT

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 1 | 0 | 0 |
| 0 | 0 | 0 | 0 | 0 | 0 | 0 | 0 |
| 0 | 0 | 0 | 0 | 0 | 0 | 0 | 0 |

FLAW INFORMATION OUTPUT FROM FLAW INFORMATION GENERATION CIRCUIT

| 0 | 0 | 0 | 0 | 0 | 0 | 0 | 0 |
|---|---|---|---|---|---|---|---|
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

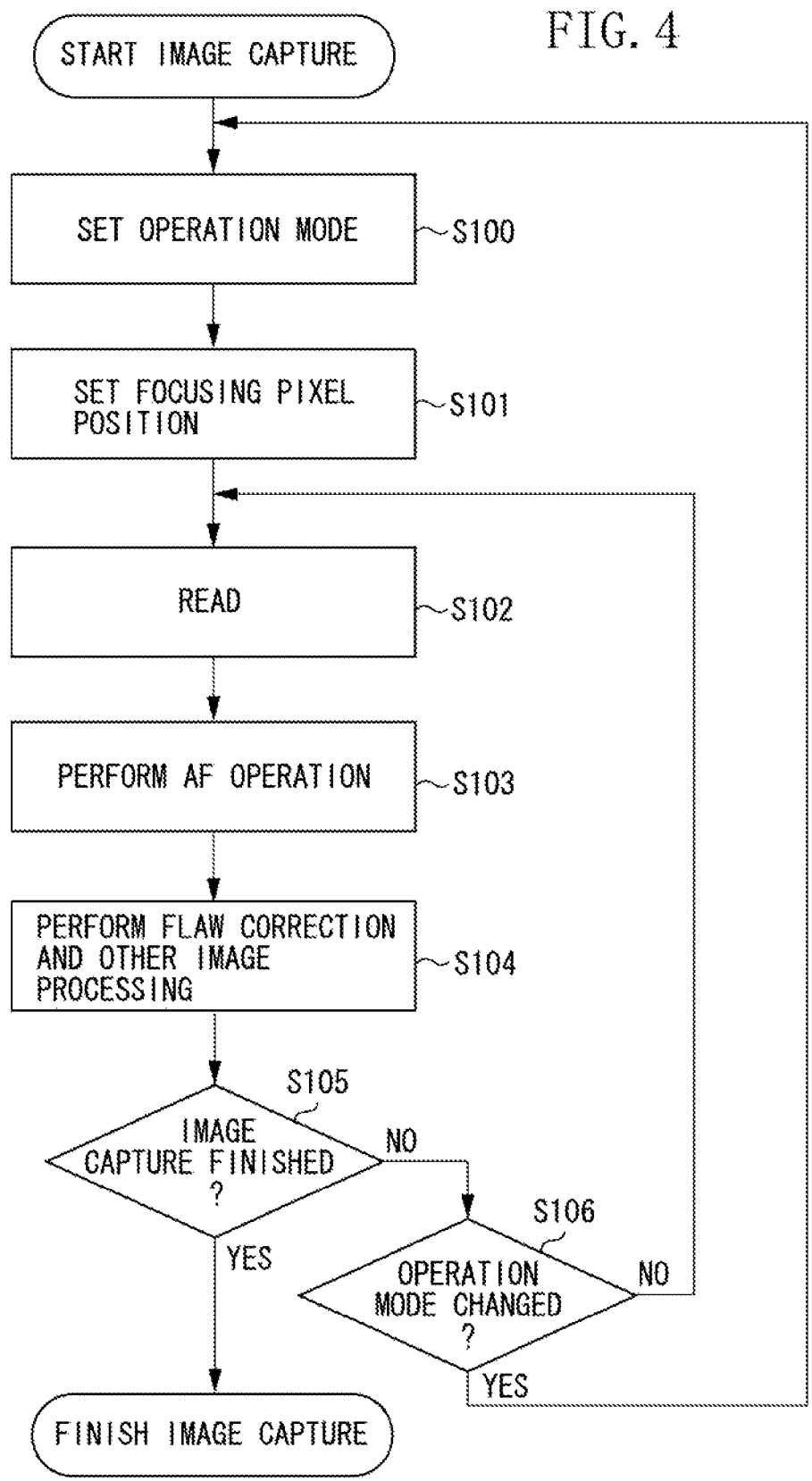

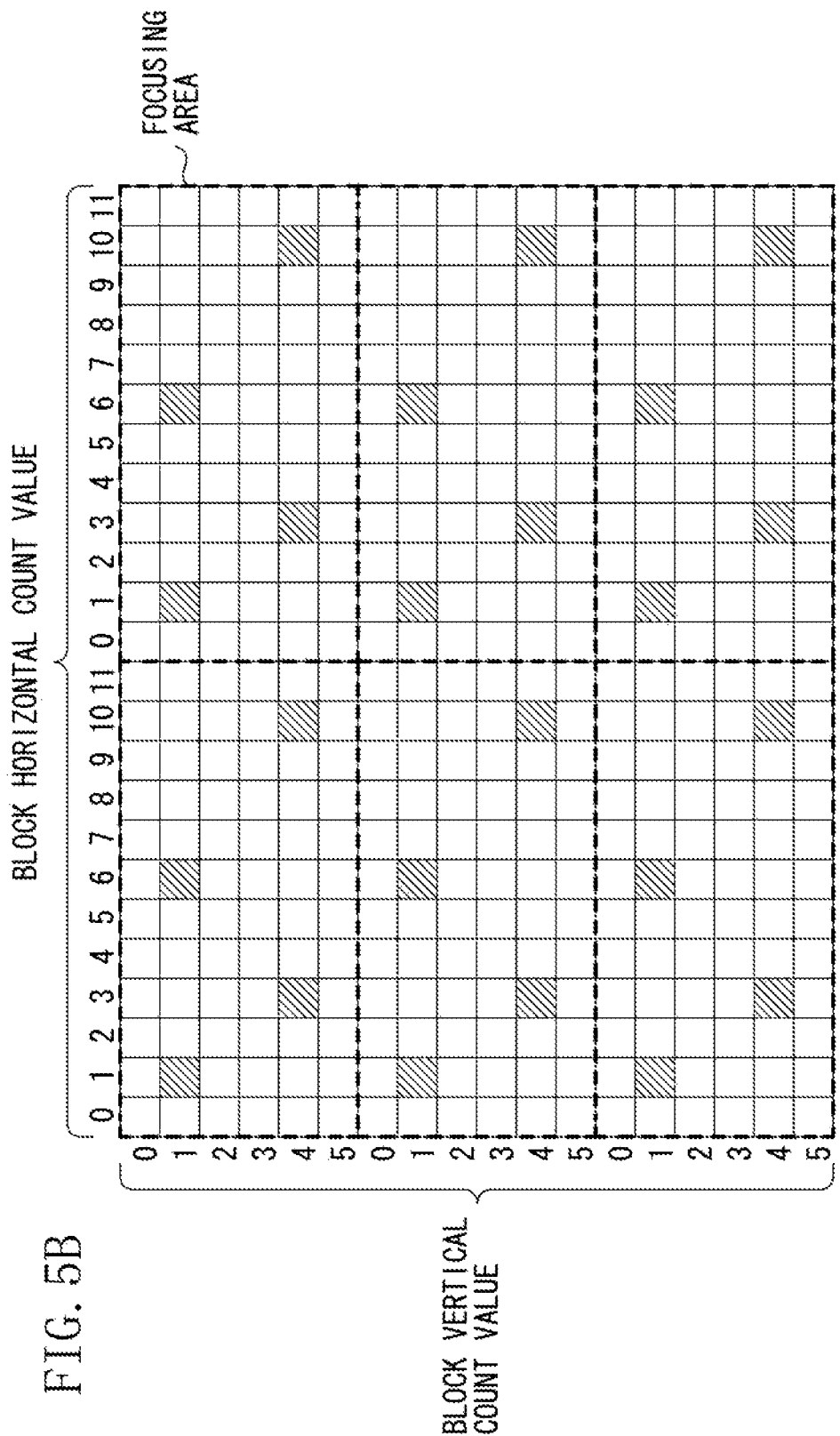

FIG. 6A

PIXEL POSITION MATCHING INFORMATION OUTPUT FROM PIXEL POSITION MATCHING CIRCUIT

IMAGE HORIZONTAL COUNT VALUE

IMAGE VERTICAL COUNT VALUE

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 |
| 6 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 |
| 11 | 0 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 |
| 16 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 6B

FLAW INFORMATION
OUTPUT FROM FLAW
DETECTION UNIT

IMAGE HORIZONTAL COUNT VALUE

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 |
| 6 | 0 | 0 | 0 | 0 | 0 | 0 | 1 | 0 | 0 | 0 | 0 | 0 | 1 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 1 | 0 | 0 | 0 | 0 | 1 | 0 | 0 | 0 | 1 | 0 | 0 | 0 | 1 | 0 | 0 | 0 | 1 | 1 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 1 | 0 | 0 | 0 | 1 | 0 | 0 | 0 | 1 | 0 | 0 | 0 | 0 | 1 | 0 | 0 |
| 12 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 1 | 0 | 0 | 0 | 0 | 0 | 0 | 0 | 0 | 0 | 0 | 1 | 0 | 0 | 1 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 1 | 0 | 0 | 0 | 0 | 0 | 0 | 0 | 0 | 0 | 1 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 18 | 0 | 0 | 0 | 0 | 0 | 1 | 0 | 0 | 0 | 0 | 0 | 0 | 0 | 0 | 0 | 1 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

IMAGE VERTICAL COUNT VALUE

FIG. 7A
FLAW INFORMATION
OUTPUT FROM FLAW
INFORMATION
GENERATION CIRCUIT

IMAGE HORIZONTAL COUNT VALUE

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

IMAGE VERTICAL COUNT VALUE

FIG. 8C

PIXEL POSITION MATCHING
INFORMATION OUTPUT
FROM PIXEL POSITION
MATCHING CIRCUIT

IMAGE VERTICAL COUNT VALUE

IMAGE HORIZONTAL COUNT VALUE

|   | 0 | 1 | 2 | 3 | 4 | 5 | 6 | 7 | 8 |
|---|---|---|---|---|---|---|---|---|---|
| 0 | 0 | 0 | 0 | 0 | 0 | 0 | 0 | 0 | 0 |
| 1 | 0 | 1 | 0 | 0 | 0 | 1 | 0 | 0 | 0 |
| 2 | 0 | 0 | 0 | 0 | 1 | 0 | 0 | 0 | 1 |
| 3 | 0 | 1 | 0 | 0 | 0 | 1 | 0 | 0 | 0 |
| 4 | 0 | 0 | 0 | 0 | 1 | 0 | 0 | 0 | 1 |
| 5 | 0 | 1 | 0 | 0 | 0 | 1 | 0 | 0 | 0 |
| 6 | 0 | 0 | 0 | 0 | 1 | 0 | 0 | 0 | 1 |

FIG. 8D

FLAW INFORMATION
OUTPUT FROM FLAW
DETECTION UNIT

IMAGE VERTICAL COUNT VALUE

IMAGE HORIZONTAL COUNT VALUE

|   | 0 | 1 | 2 | 3 | 4 | 5 | 6 | 7 | 8 |
|---|---|---|---|---|---|---|---|---|---|
| 0 | 0 | 0 | 0 | 0 | 0 | 0 | 0 | 0 | 0 |
| 1 | 0 | 1 | 0 | 0 | 0 | 1 | 0 | 0 | 0 |
| 2 | 0 | 1 | 0 | 0 | 1 | 0 | 0 | 0 | 1 |
| 3 | 0 | 1 | 0 | 0 | 0 | 1 | 0 | 0 | 0 |
| 4 | 0 | 0 | 0 | 0 | 1 | 0 | 0 | 1 | 1 |
| 5 | 0 | 1 | 0 | 0 | 0 | 1 | 0 | 0 | 0 |
| 6 | 0 | 0 | 0 | 0 | 1 | 0 | 0 | 0 | 1 |

FIG. 9A

FLAW INFORMATION OUTPUT
FROM FLAW INFORMATION
GENERATION CIRCUIT

IMAGE HORIZONTAL COUNT VALUE

|   | 0 | 1 | 2 | 3 | 4 | 5 | 6 | 7 | 8 |
|---|---|---|---|---|---|---|---|---|---|
| 0 | 0 | 0 | 0 | 0 | 0 | 0 | 0 | 0 | 0 |
| 1 | 0 | 0 | 0 | 0 | 0 | 0 | 0 | 0 | 0 |
| 2 | 0 | 1 | 0 | 0 | 0 | 0 | 0 | 0 | 0 |
| 3 | 0 | 0 | 0 | 0 | 0 | 0 | 0 | 0 | 0 |
| 4 | 0 | 0 | 0 | 0 | 0 | 0 | 0 | 1 | 0 |
| 5 | 0 | 0 | 0 | 0 | 0 | 0 | 0 | 0 | 0 |
| 6 | 0 | 0 | 0 | 0 | 0 | 0 | 0 | 0 | 0 |

IMAGE VERTICAL COUNT VALUE

FIG. 9B

IMAGE HORIZONTAL COUNT VALUE

FOCUSING PIXEL

IMAGE VERTICAL COUNT VALUE

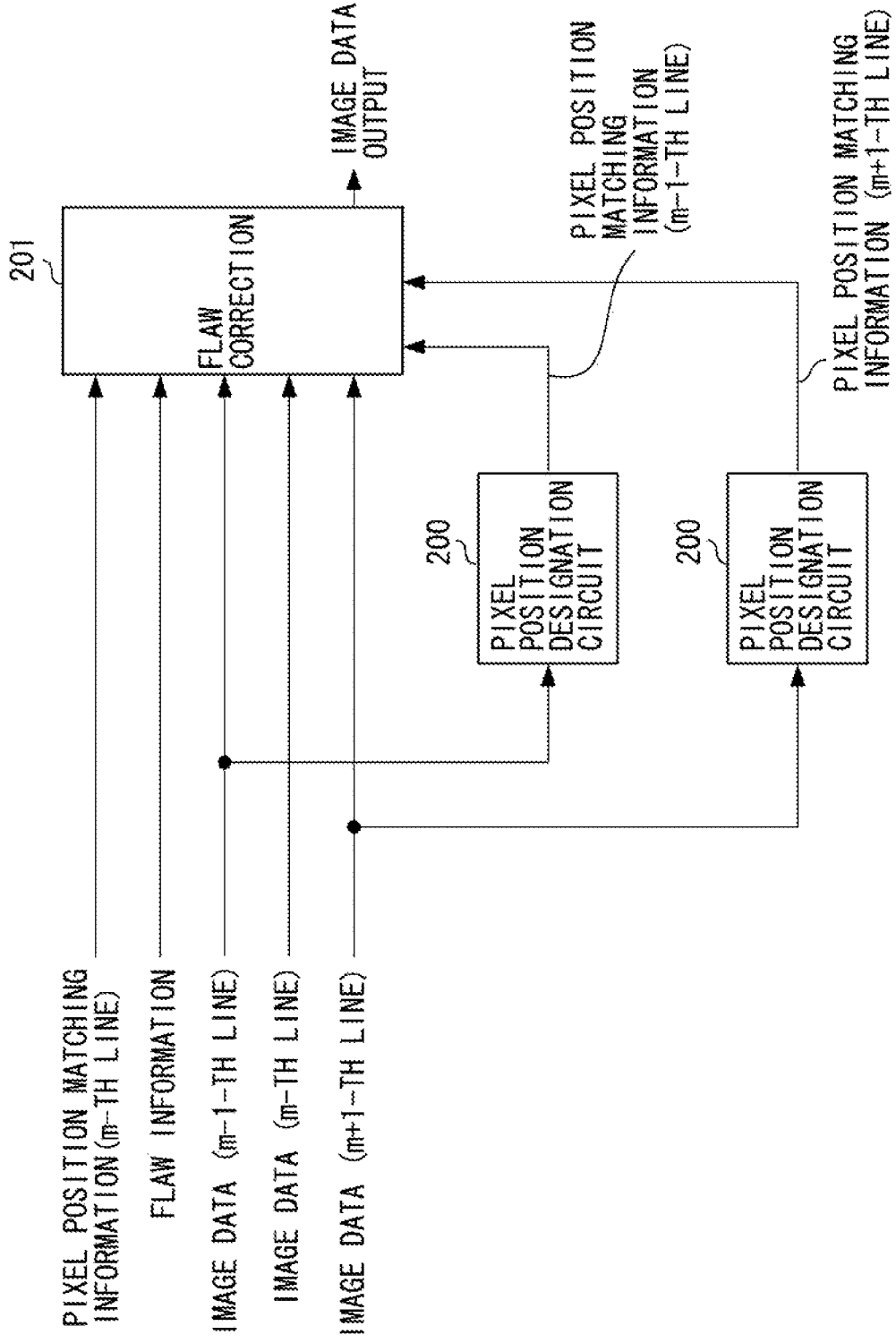

FIG. 11A

| | | | |
|---|---|---|---|
| (m−1-TH LINE) | B1 | B2 | B3 |
| (m-TH LINE) | B4 | B5 | B6 |
| (m+1-TH LINE) | B7 | B8 | B9 |

FIG. 11B

| | | | |
|---|---|---|---|
| (m−1-TH LINE) | C1 | C2 | C3 |
| (m-TH LINE) | C4 | C5 | C6 |
| (m+1-TH LINE) | C7 | C8 | C9 |

IMAGE CAPTURE APPARATUS AND METHOD FOR CONTROLLING IMAGE CAPTURE APPARATUS IN WHICH DEFECTIVE PIXELS ARE INDICATED

BACKGROUND OF THE INVENTION

1. Field of the Invention

The present invention relates to an image capture apparatus that uses a solid-state image sensor, and a method for processing a defective pixel in an image capture apparatus.

2. Description of the Related Art

In recent image capture apparatuses, the number of pixels in a solid-state image sensor, as represented by a charge-coupled device (CCD) sensor and a complementary metal oxide semiconductor (CMOS) sensor, for example, has been increasing. With this increase, the occurrence of defective pixels (flaws) on the image sensor has also been increasing. Examples of defective pixels include production flaws that are produced during the production process of the image sensor, and growth flaws that occur after being mounted in the image capture apparatus. Among growth flaws, some flaws can be further categorized as temperature-characteristic-dependent flaws that increase and decrease during usage dependent on the temperature of the image capture apparatus. Among such defective pixels, for the production flaws, the flaws are corrected in advance by capturing a black image when shipped from the factory, and detecting the position of the defective pixels. Further, for the growth flaws, the defective pixels can be detected and corrected by capturing a black image by forcibly blocking light from the image sensor when turning the power on. However, in the above methods, the temperature-characteristic-dependent flaws that occur during usage of the image capture apparatus dependent on temperature changes cannot be detected.

Japanese Patent Application Laid-Open No. 2004-015191 discusses a method for detecting and correcting defective pixels from a captured image. In the method discussed in Japanese Patent Application Laid-Open No. 2004-015191, the luminance of each pixel is compared with the luminance of surrounding pixels, and pixels that have a luminance different by a predetermined level or more are determined as being white flaws.

However, in the method discussed in Japanese Patent Application Laid-Open No. 2004-015191, in the output of an image sensor that includes focusing pixels, since the difference between the output value of the focusing pixels and the output value of the imaging pixels is large, there is the problem that the output value of the focusing pixels is recognized as a pixel defect.

SUMMARY OF THE INVENTION

The present invention is directed to an image capture apparatus and a method for controlling the image capture apparatus capable of appropriately correcting pixel defects even for an image sensor that includes focusing pixels, and outputting a good image without decreasing focusing calculation accuracy.

According to an aspect of the present invention, an image capture apparatus includes an image sensor in which a plurality of types of pixels including a specific pixel is arranged, and a detection unit configured to detect a defective pixel based on a pixel value of each pixel in the image sensor, wherein the detection unit is configured to exclude the specific pixel from a target of the defective pixel based on information indicating a position of the specific pixel in the image sensor.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C are block diagrams illustrating a configuration of a flaw processing circuit according to the first and second exemplary embodiments.

FIGS. 3A and 3B illustrate a data array according to the first exemplary embodiment.

FIG. 4 is a flowchart illustrating operation of an image capture apparatus according to the first exemplary embodiment.

FIGS. 5A and 5B illustrate an image data array and flaw information according to the first exemplary embodiment.

FIGS. 6A and 6B illustrate an image data array and flaw information according to the first exemplary embodiment.

FIGS. 7A and 7B illustrate an image data array and flaw information according to the first exemplary embodiment.

FIGS. 8A, 8B, 8C, and 8D illustrate an image data array and flaw information according to the first exemplary embodiment.

FIGS. 9A and 9B illustrate an image data array and flaw information according to the first exemplary embodiment.

FIGS. 10A and 10B are block diagrams illustrating a configuration of a flaw correction circuit according to the first and second exemplary embodiments.

FIGS. 11A and 11B illustrate an image data array according to the second exemplary embodiment.

DESCRIPTION OF THE EMBODIMENTS

Various exemplary embodiments, features, and aspects of the invention will be described in detail below with reference to the drawings.

Figure 1:
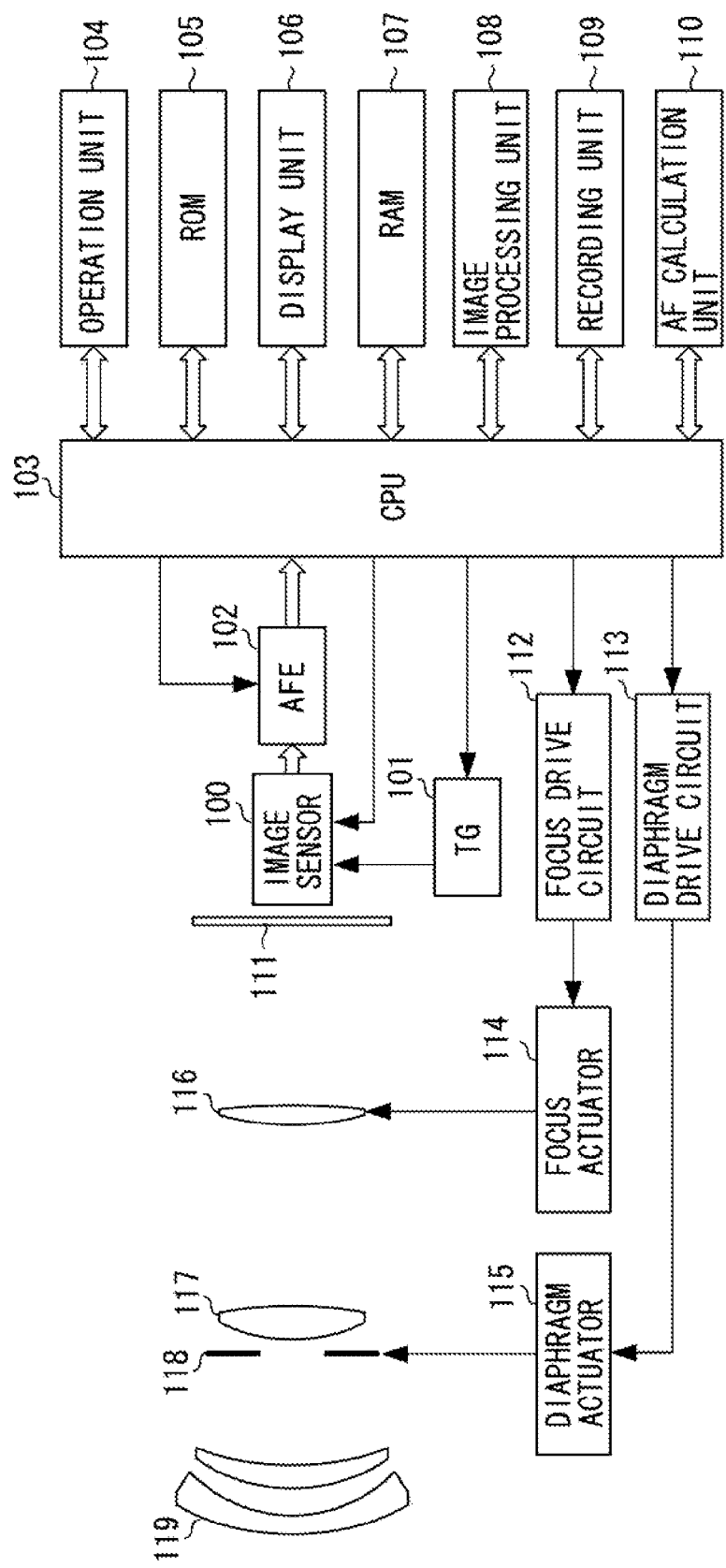
FIG. 1 is a block diagram illustrating a configuration of an image capture apparatus according to first and second exemplary embodiments of the present invention.

A first exemplary embodiment will now be described below. FIG. 1 illustrates a configuration of an image capture apparatus according to the present exemplary embodiment. An image sensor 100 converts an optical image received via an optical system, which includes a front lens group 119, a diaphragm 118, a second lens group 117, a rear lens group 116, and a focal plane shutter 111, into an electric signal (an analog signal, i.e., an image signal). The analog signal output from the image sensor 100 is gain-adjusted by an analog front end (AFE) 102, and converted into a digital signal (image data) based on a predetermined quantization bit. The drive timing of the image sensor 100 and the AFE 102 is controlled by a timing generator (TG) 101.

A random access memory (RAM) 107 is a memory (an image memory) for storing image data output from the AFE 102 and image data processed by a (below-described) image processing unit 108. The RAM 107 is also used as a work memory by a (below-described) central processing unit (CPU) 103. Further, although the RAM 107 is used for the image memory and work memory, some other memory may also be used as long as its access speed is sufficient.

A read-only memory (ROM) 105 stores programs operated on the CPU 103. In the example illustrated in the drawings, although a flash ROM is used as the ROM 105, a memory other than a flash ROM can also be used as long as its access speed is sufficient.

The CPU 103 controls the various units in an integrated manner. The image processing unit 108 subjects image data obtained by image capturing to imaging processing, such as white balance processing, interpolation processing (demosaicing), development processing, gamma processing, and distortion correction processing, and processing such as compression and encoding. Further, the image processing unit 108 includes a (below described) flaw correction unit 201.

A recording unit 109 is, for example, a non-volatile memory or a hard disk. In the recording unit, still image data and moving image data are recorded, for example.

In the example illustrated in the diagram, although the recording unit 109 is included in the image capture apparatus, a recording medium may also be used such as a non-volatile memory and a hard disk that can be attached/detached via a connector.

An operation unit 104 is used when issuing imaging commands and setting items, such as the imaging conditions, to the CPU 103. A display unit 106 displays still images and moving images obtained by imaging as well as menus under the control of the CPU 103.

The front lens group 119 is arranged at the front of an imaging optical system (an image forming optical system). The rear lens group 116 is held so that it can advance/retract in the direction of the optical axis. Focus adjustment is performed by advancing/retracting the rear lens group 116 in the direction of the optical axis. The diaphragm 118 performs light-quantity adjustment during imaging by adjusting its aperture diameter. A zoom effect (a zoom function) is performed by advancing/retracting the diaphragm 118 and the second lens group 117 together in the optical axis direction in conjunction with the advance/retract operation of the rear lens group 116.

The focal plane shutter 111 adjusts the exposure time when capturing still images. In the present exemplary embodiment, although the exposure time of the image sensor 100 is adjusted by the focal plane shutter 111, some other configuration may also be employed. For example, the image sensor 100 may include an electronic shutter function, and the exposure time be adjusted based on a control pulse.

A focus drive circuit 112 performs drive control on a focus actuator 114 based on a result of focus detection by an automatic focus (AF) calculation unit 110, and advancing/retracting the rear lens group 116 in the optical axis direction for focus adjustment. A diaphragm drive circuit 113 controls the aperture of the diaphragm 118 by driving and controlling a diaphragm actuator 115.

Figure 2A:
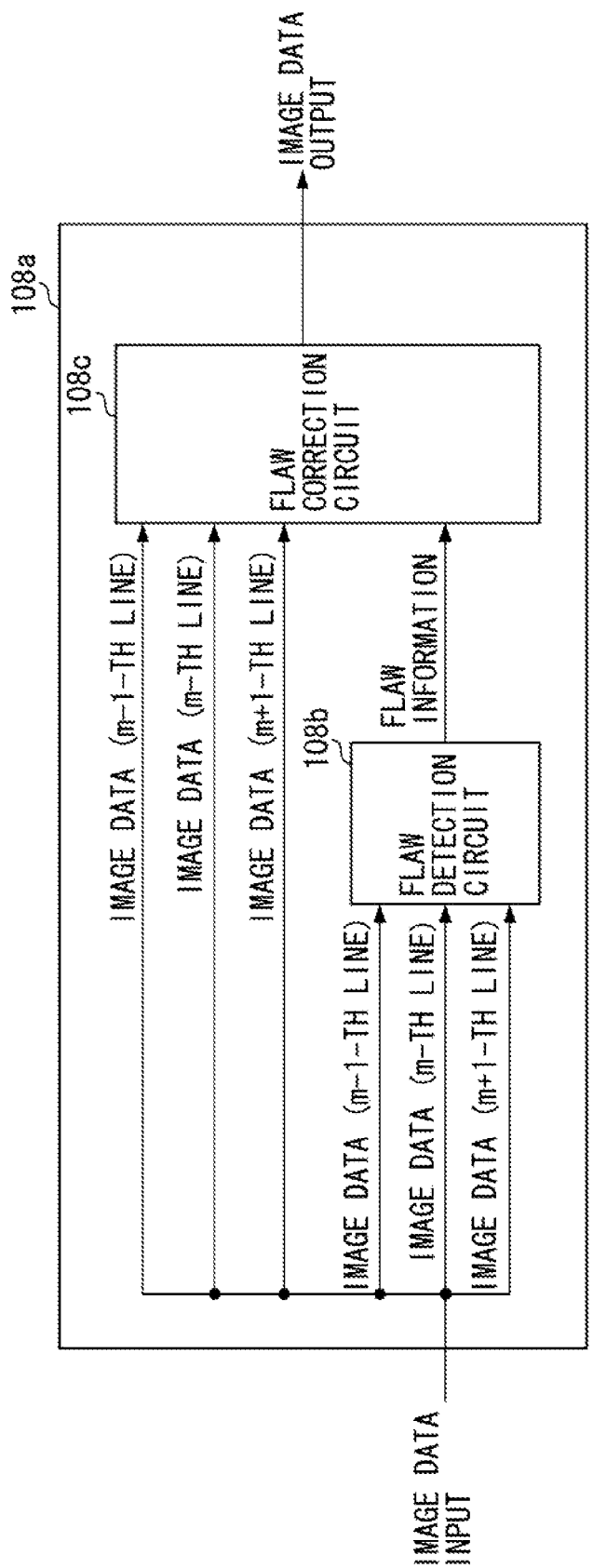
Figure 2B:
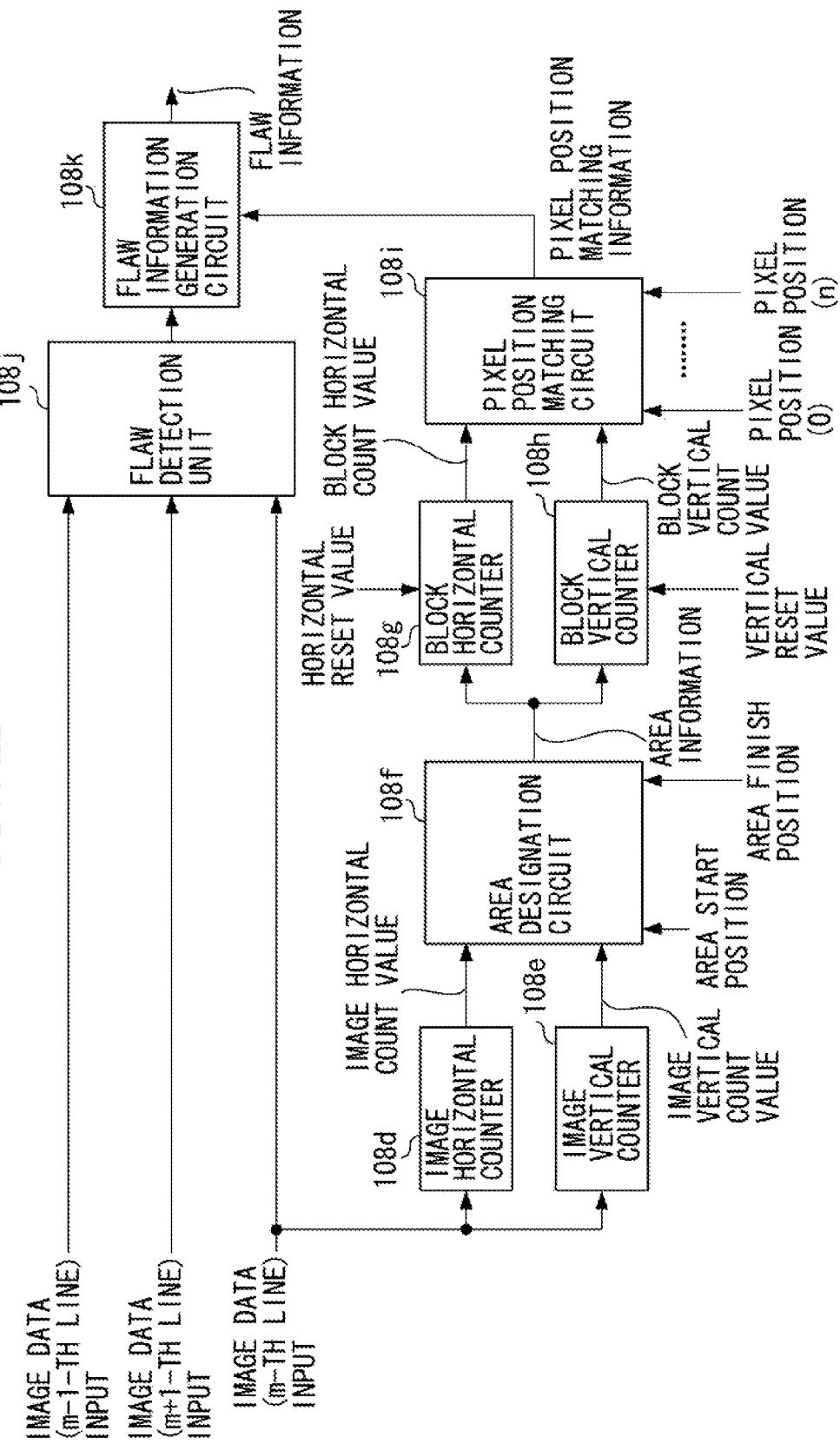

FIGS. 2A, 2B, and 2C illustrate a configuration of a flaw (a pixel defect) processing circuit in the image processing unit 108 illustrated in FIG. 1.

A flaw processing circuit 108a includes a flaw detection circuit 108b and a flaw correction circuit 108c. The image data is input by line units in order in the horizontal direction. When the image data for an m-th line, which is a target line, and the m−1-th line and m+1-th line are input into the flaw processing circuit 108a, that data is input into the flaw detection circuit 108b. Flawed pixels are detected in the image data by the flaw detection circuit 108b, and flaw information indicating that those pixels are a flaw is input into the flaw correction circuit 108c.

The flaw detection circuit 108b has a configuration illustrated in FIG. 2B.

When the pixel illustrated in FIG. 3A is input to a flaw detection unit 108j, a target pixel for flaw detection is A5. A center value (a representative value) of the pixel values is calculated for A1, A2, A3, A4, A6, A7, A8, and A9, which are the pixels surrounding the target pixel A5. A difference between the calculated center value and the pixel value of A5 is calculated. If that difference is equal to or greater than a predetermined value, the pixel is recognized as a flaw, and flaw information is output. The flaw information is output as "1" if a flaw is recognized, and output as "0" if a flaw is not recognized. At this point, since a pixel provided for focusing, for example, has a different configuration from ordinary pixels, even if the pixel itself is normal and not a flaw, the difference between that pixel and other pixels may be equal to or greater than the predetermined value. Accordingly, in the present exemplary embodiment, pixel values are prevented from being corrected as a flaw by using pre-set pixel position matching information to specify that such pixels are focusing pixels.

Generation of the pixel position matching information will now be described. The configuration illustrated in FIG. 2B includes an image horizontal counter 108d that counts the number of pixels in the horizontal direction of the image, an image vertical counter 108e that counts the number of pixels in the vertical direction of the image, and an area designation circuit 108f. Area information indicating an area in which a specific pixel is present is output by referring to an image horizontal count value output from the image horizontal counter 108d, an image vertical count value output from the image vertical counter 108e, and an area start position and an area finish position set by the CPU 103. This area information is "1" if the position of the input image data is within an area designated by the area start position and area finish position, and is "0" if the position is not within that area. The configuration illustrated in FIG. 2B also includes a block horizontal counter 108g and a block vertical counter 108h. If focus area information output from the area designation circuit 108f is "1", the number of horizontal and vertical pixels are each counted. The block horizontal counter 108g resets the block horizontal count value at a predetermined period based on a horizontal reset value set by the CPU 103. Further, the block vertical counter 108h resets the block vertical count value at a predetermined period based on a vertical reset value set by the CPU 103. Based on this operation, the area is divided into areas (blocks) having a predetermined size. A pixel position matching circuit 108i refers to the block horizontal count value, the block vertical count value, and a plurality of pixel positions set by the CPU 103. The pixel position includes information about the horizontal position and the vertical position in the block. If the block horizontal count value and the block vertical count value match any of the set pixel positions, "1" is output as the pixel position matching information. If there is no match, "0" is output.

In the present exemplary embodiment, although the specific pixel is a pixel for focusing, naturally the specific pixel may be employed for some other application. For example, the specific pixel may be used for color measurement or light measurement applications, or may be provided as a pixel used for optical black (OB) clamping by blocking light.

FIG. 2C illustrates a configuration of a flaw information generation circuit 108k. In the flaw information generation circuit 108k, the flaw information from the flaw detection unit 108j and the pixel position matching information from the pixel position matching circuit 108i are referred to. As illustrated in FIG. 3B, if the flaw information from the flaw detection unit 108j is "1", "1" is output when the pixel position matching information is "0", and "0" is output when the pixel position matching information is "1". In other words, even if a pixel having a certain pixel position is determined to be a flaw, when that pixel position is a pre-set pixel position, "0" is output as the flaw information.

In the flaw correction circuit 108c, image data for the m−1-th to m+1-th lines and the flaw information output from the flaw detection circuit 108b are input, and an average value of the values for the A1, A2, A3, A4, A6, A7, A8, and A9 pixels, which are the pixels surrounding the target pixel A5, is calculated. If the flaw information for the target pixel A5 is "1", the A5 pixel value is replaced with the calculated average value, and this data is output. If the flaw information is "0", the A5 pixel value is output as is.

Based on the above operation, a pre-set (designated) pixel position is not subjected to flaw correction, which allows correction only of other flaws.

In the present exemplary embodiment, the example has been described in which a pixel having a designated position is excluded as a target from flaw detection. However, if a pixel having a designated position is included in the pixels surrounding the target pixel when performing flaw detection, it may not be necessary to use the specific pixel for the calculation of the center value. Further, when calculating the center value, processing may also be performed that, for example, lowers a weighting given to the pixel value of the specific pixel as compared with that of the other pixels.

Next, operation of the image capture apparatus according to the present exemplary embodiment will be described. FIG. 4 is a flowchart illustrating operation of the image capture apparatus according to the present exemplary embodiment.

When imaging is started by the operation unit 104, in step S100, the CPU 103 performs setting of the image sensor 100, the TG 101, and the AFE 102 based on a moving image operation mode (a first mode) that is pre-set using the display unit 106 and the operation unit 104.

In the image sensor 100 according to the present exemplary embodiment, a plurality of types of pixel is arranged. Pixels that are ordinarily used for recording images, for example, red (R), green (G), and blue (B) pixels, are arranged. In addition, focusing pixels are discretely and periodically arranged. The position of the focusing pixels in the image data output from the image sensor 100 is changed based on operation mode, such as read-all-pixels, pixel addition, pixel thinning, and cropping. The first mode is the read-all-pixels mode, in which, for example, the pixels with hatching illustrated in FIG. 5A (pixels with an image vertical count value and image horizontal count value (V,H) of (3,3), (3,8), (3,15) . . . ) are the focusing pixels.

In step S101, the CPU 103 performs a setting for designating the focusing pixel position in the flaw detection circuit 108b. The CPU 103 sets the area start position as (2,2), and the area finish position as (19,25). Further, the CPU 103 sets the horizontal reset value of the block horizontal counter to 11, and the vertical reset value of the block vertical counter to 5. Then, the CPU 103 sets the first mode focusing pixel position by setting as the pixel position information the block horizontal count value and the block vertical count value (Vb,Hb) to (1,1), (1,6), (4,3), and (4,10). Next, in step S102, the CPU 103 starts reading of the image data. The image data read from the image sensor is subjected to analog-to-digital (AD) conversion by the AFE 102, the converted data is stored in the RAM 107, and then input to the image processing unit 108. The image data input to the image processing unit 108 is subjected to flaw correction based on the above-described processing by the flaw processing circuit 108a.

When the image is input to the flaw detection circuit 108b, based on the set area start position (2,2) and the area finish position (19,25), area information ("1") is output from the area designation circuit 108f. This area serves as a focusing area. Based on the focusing information, the block horizontal counter 108g and the block vertical counter 108h are operated. Based on the set horizontal reset value 11 and the vertical reset value 5, as illustrated in FIG. 5B, the focusing area is divided into blocks formed of a 12-pixel period in the horizontal direction and a 6-pixel period in the vertical direction. The pixel position matching circuit 108i refers to the block horizontal count value and the block vertical count value, and outputs pixel position matching information "1" for the pixels that match the set pixel position information (1,1), (1,6), (4,3), and (4,10). FIG. 6A illustrates the results of this operation. In FIG. 6A, it is illustrated that the pixel position matching information is "1" at the pixel positions corresponding to the focusing pixels.

Figure 5A:
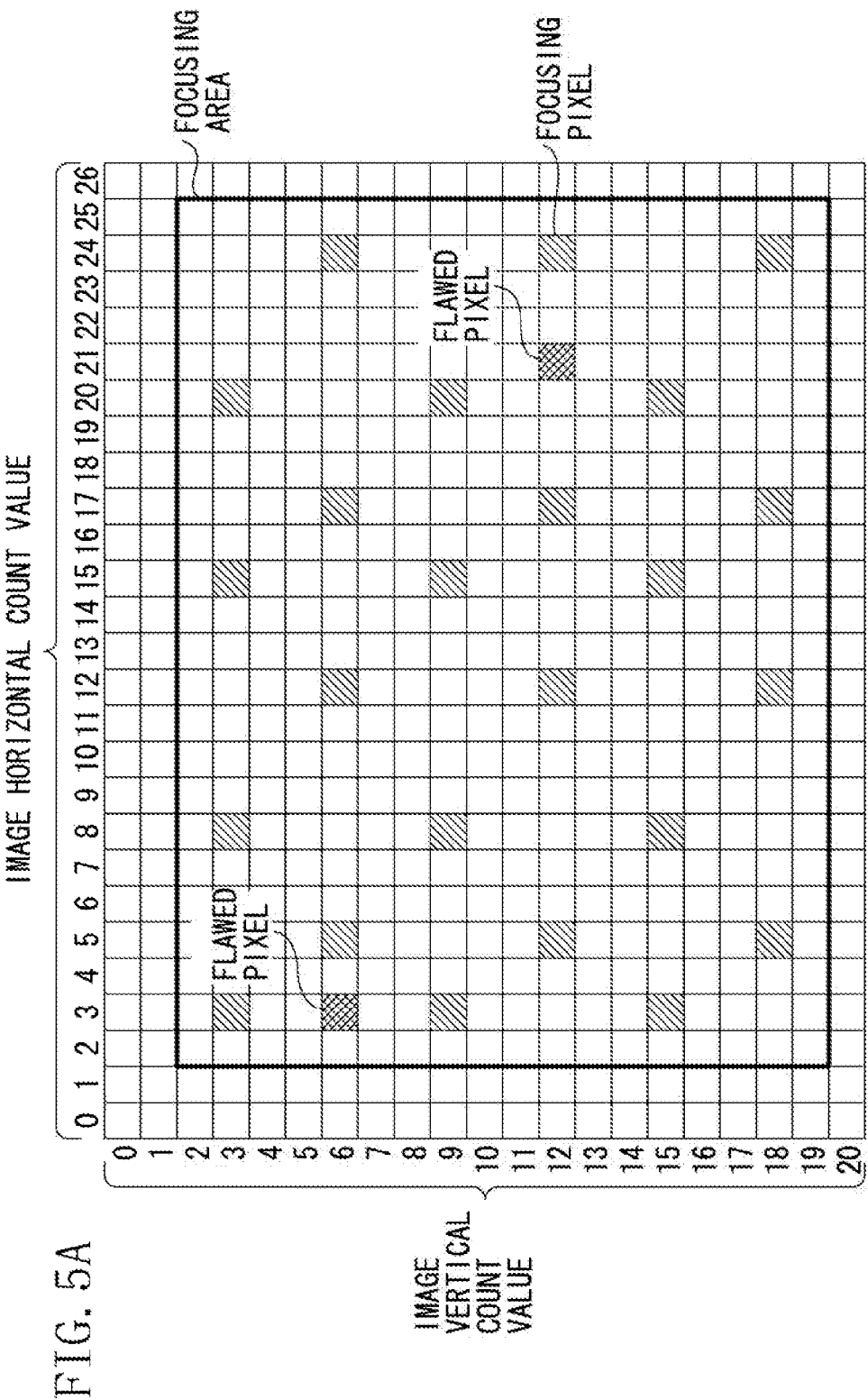
Figure 7B:
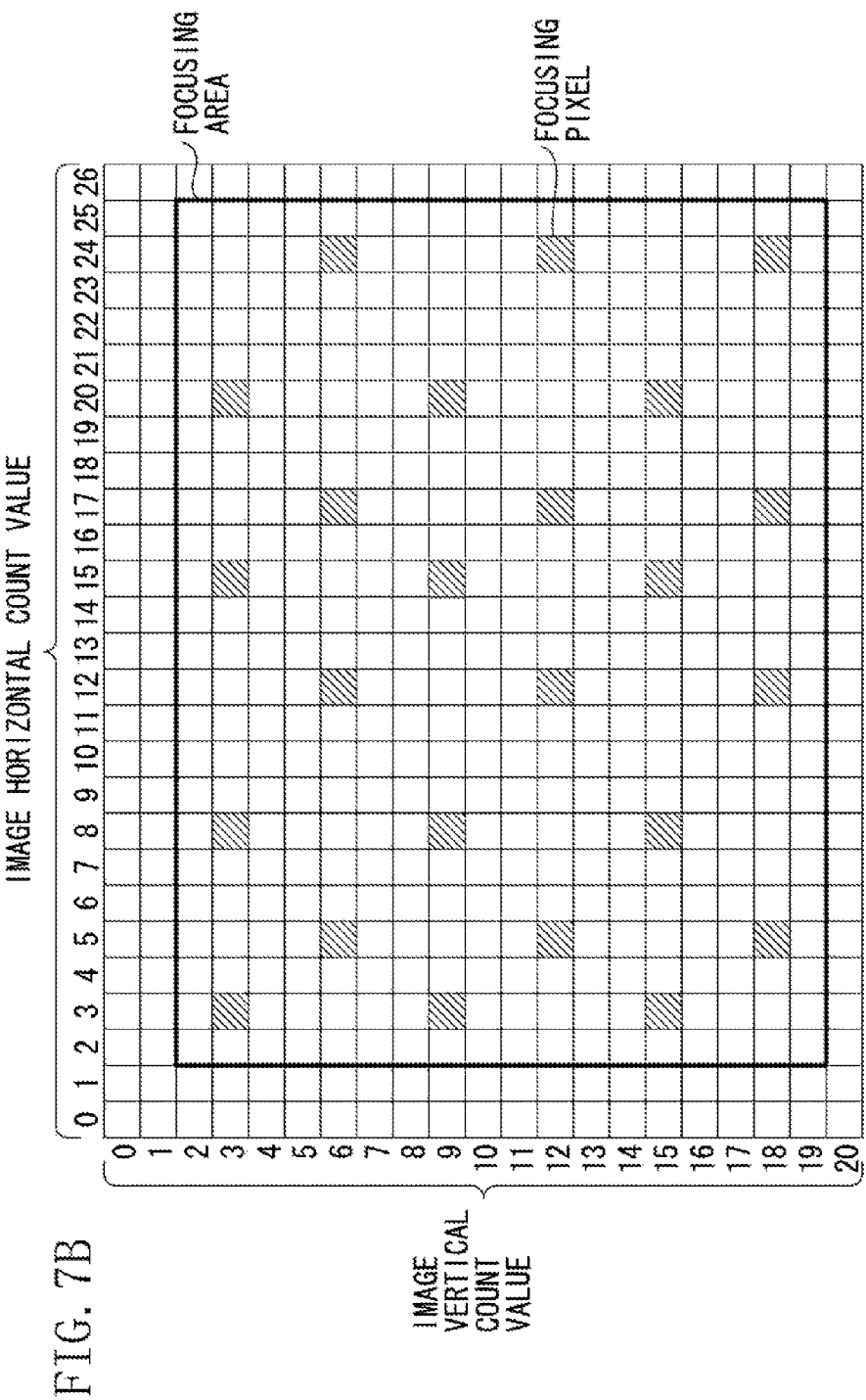

For example, if the pixels (6,3) and (12,21) illustrated in FIG. 5A are flawed pixels, the flaw detection unit 108j outputs the flaw information illustrated in FIG. 6B. For example, in the present exemplary embodiment, all of the focusing pixels are detected as flaws. The pixel positions (6,3) and (12,21), which are flawed pixels, and the pixel positions corresponding to the focusing pixels, are indicated with "1". This flaw information and pixel position matching information is input into the flaw information generation circuit 108k. The pixels whose pixel position matching information is "1" are excluded from the flaw information, so that flaw information is output in which only (6,3) and (12,21) are indicated as being flaws (FIG. 7A). Based on the flaw information output from the flaw information generation circuit 108k, an image is output in which only the pixels positioned at (6,3) and (12,21) has been subjected to flaw correction by the flaw correction circuit 108c, and the focusing pixels are output without correction (FIG. 7B). Based on the above operation, image data in which the focusing pixels are excluded from the flaw correction target, with only the flawed pixels having been corrected, is output from the flaw processing circuit 108a.

In step S103, the image data is input from the image processing unit 108 to the AF calculation unit 110, and an amount of focus deviation is calculated by performing a predetermined calculation using the focusing pixels. The AF calculation unit 110 outputs the calculated amount of focus deviation to the focus drive circuit 112. The focus drive circuit 112 calculates an amount for driving the rear lens group 116 based on the deviation amount acquired from the AF calculation unit 110, and outputs a drive command to the focus actuator 114. The rear lens group 116 is moved by the focus actuator 114 to the in-focus position, so that the image sensor 100 is in an in-focus state.

In step S104, the above-described flaw correction processing by the flaw processing circuit 108a and other image processing are performed in the image processing unit 108, and the processed data is recorded as a moving image in the recording unit 109.

Then, in step S105, the CPU 103 determines whether imaging has been finished. If it is determined that imaging has been finished (YES in step S015), the CPU 103 finishes imaging processing. If it is determined that imaging has not been finished (NO in step S105), the processing proceeds to step S016.

In step S106, the CPU 103 determines whether the operation mode has been changed. If it is determined that the operation has not been changed (NO in step S106), the processing returns to step S102, and the subsequent operations of reading of the image data are repeated. If it is determined that the operation has been changed (a second operation mode) (YES in step S106), the processing returns to step S100, and the CPU 103 performs setting of the image sensor 100, the TG 101, and the AFE 102 based on the second operation mode.

The second operation mode is a ⅓ thinning mode, in which pixel data that has been thinned by ⅓ in each of the horizontal and vertical directions of the pixel array is output from the image sensor 100. The pixels with hatching illustrated in FIG. 8A (pixels with an image vertical count value and image horizontal count value (V,H) of (1,1), (1,5), (2,4) . . . ) are the focusing pixels.

In step S101, the CPU 103 performs a setting for designating the focusing pixel position in the flaw detection circuit 108b. The CPU 103 sets the area start position as (1,1), and the area finish position as (6,8). Further, the CPU 103 sets the horizontal reset value of the block horizontal counter to 7, and the vertical reset value of the block vertical counter to 1. Then, the CPU 103 sets the second mode focusing pixel position by setting as the pixel position information the block horizontal count value and the block vertical count value (Vb,Hb) to (0,0), (0,4), (1,3), and (1,7). Next, in step S102, the CPU 103 starts the reading of the image data. The image data read from the image sensor is subjected to AD conversion by the AFE 102, the converted data is stored in the RAM 107, and then input to the image processing unit 108. The image data input to the image processing unit 108 is subjected to flaw correction based on the above-described processing by the flaw processing circuit 108a.

When the image is input to the image processing unit 108, based on the set area start position (1,1) and the area finish position (6,8), area information ("1") is output from the area designation circuit 108f. This area serves as a focusing area. Based on the area information, the block horizontal counter 108g and the block vertical counter 108h are operated. Based on the set horizontal reset value 7 and the vertical reset value 1, as illustrated in FIG. 8B, a focusing area is divided into blocks formed of an 8-pixel period in the horizontal direction and a 2-pixel period in the vertical direction. The pixel position matching circuit 108i refers to the block horizontal count value and the block vertical count value, and outputs pixel position matching information "1" for the pixels that match the set pixel position information (0,0), (0,4), (1,3), and (1,7). FIG. 8C illustrates the results of this operation. In FIG. 8C, it is illustrated that the pixel position matching information is "1" at the pixel positions corresponding to the focusing pixels.

Figure 8A:
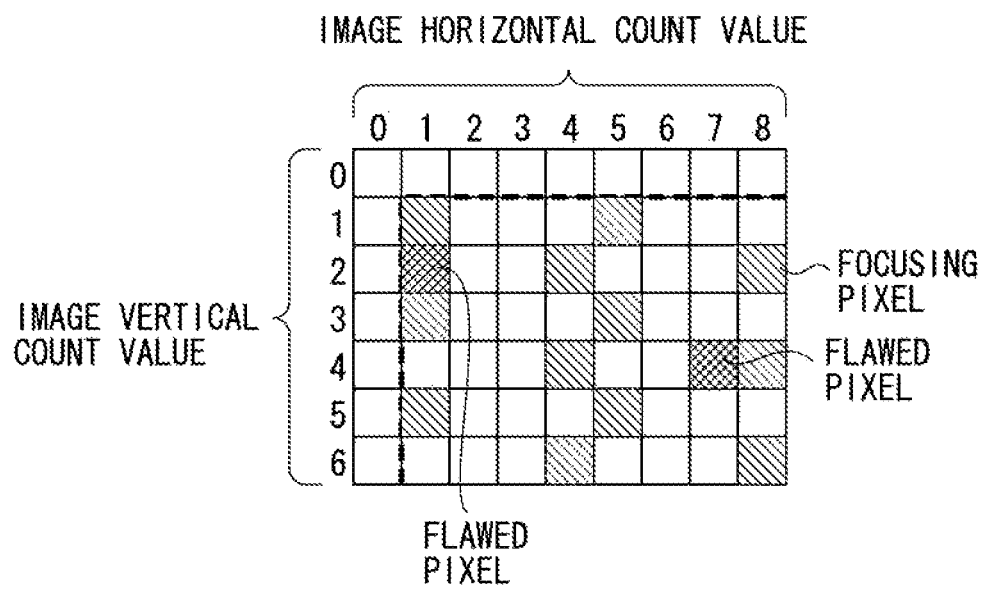
Figure 8B:
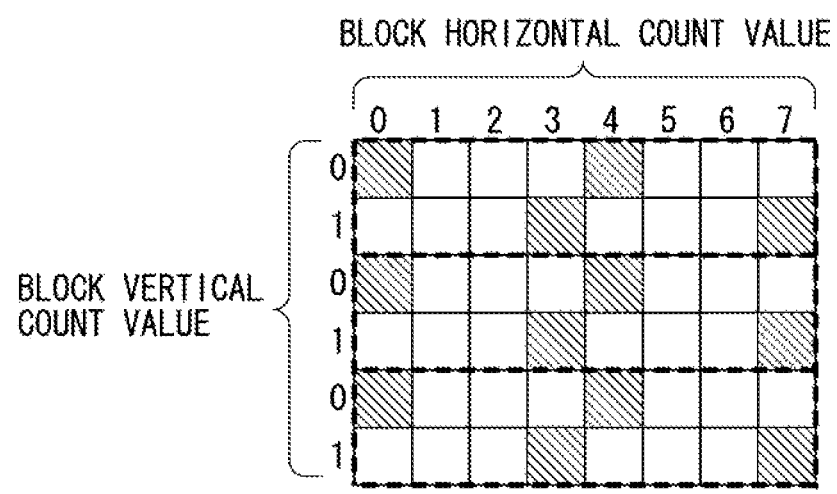

For example, if the pixels (2,1) and (4,7) illustrated in FIG. 8A are flawed pixels, the flaw detection unit 108j outputs flaw information illustrated in FIG. 8D. For example, in the present exemplary embodiment, all of the focusing pixels are detected as flaws. The pixel positions (2,1) and (4,7), which are flawed pixels, and the pixel positions corresponding to the focusing pixels, are indicated with "1". This flaw information and pixel position matching information is input into the flaw information generation circuit 108k. The pixels whose pixel position matching information is "1" are excluded from the flaw information, so that flaw information is output in which only the pixels (2,1) and (4,7) are indicated as being flaws (FIG. 9A). Based on the flaw information output from the flaw information generation circuit 108k, an image is output in which only the pixels positioned at (2,1) and (4,7) has been subjected to flaw correction by the flaw correction circuit 108c, and the focusing pixels are output without correction (FIG. 9B). Based on the above operation, image data in which the focusing pixels are excluded from the flaw correction target, with only the flawed pixels having been corrected, is output from the flaw processing circuit 108a.

The operations following step S103 are performed in the similar manner as described above.

Thus, by performing flaw detection in an image by designating a focus area, a focusing pixel period, and a focusing pixel position for each read operation mode, focusing information can be appropriately extracted without subjecting the focusing pixel data to flaw correction. Consequently, a good image can be provided without decreasing AF calculation accuracy.

According to the configuration of the present exemplary embodiment, rather than each operation mode separately having position information about all the focusing pixels, each operation mode includes as information a period of the focusing pixel positions. This may decrease the data amount indicating the focusing pixel positions and the memory for storing data.

Further, the position information about all the focusing pixels may be included in each operation mode. In addition, each mode, such as thinning, may include position information about the focusing pixels when reading all the pixels, and process and apply the position information, for example.

A second exemplary embodiment will now be described. In the present exemplary embodiment, not only is a specific pixel that is specified using pixel position matching information excluded from pixels serving as a flaw detection target and a flaw correction target, but the pixel value of the specific pixel is also excluded when performing the calculation of a flaw correction value.

Since a configuration of the image capture apparatus according to the present exemplary embodiment is the same as the image capture apparatus described in the first exemplary embodiment, a description of the configuration will not be repeated here. Further, since the operations of the image capture apparatus from imaging to recording are performed based on the flow similar to that in the first exemplary embodiment illustrated in FIG. 4, a description of the operations will not be repeated here. The processing different from the first exemplary embodiment is flaw correction processing, and the unit for realizing that is the flaw correction circuit 108c.

FIG. 10A illustrates a configuration of the flaw correction circuit 108c according to the present exemplary embodiment. The flaw correction circuit 108c includes a flaw correction unit 201 and a pixel position designation circuit 200.

In the flaw correction unit 201, when the pixels illustrated in FIG. 11A are input, a target pixel subjected to flaw correction is B5. An average value of pixel values is calculated for B1, B2, B3, B4, B6, B7, B8, and B9, which are the pixels surrounding the target pixel B5. The calculated average value is output as image data.

Figure 10B:
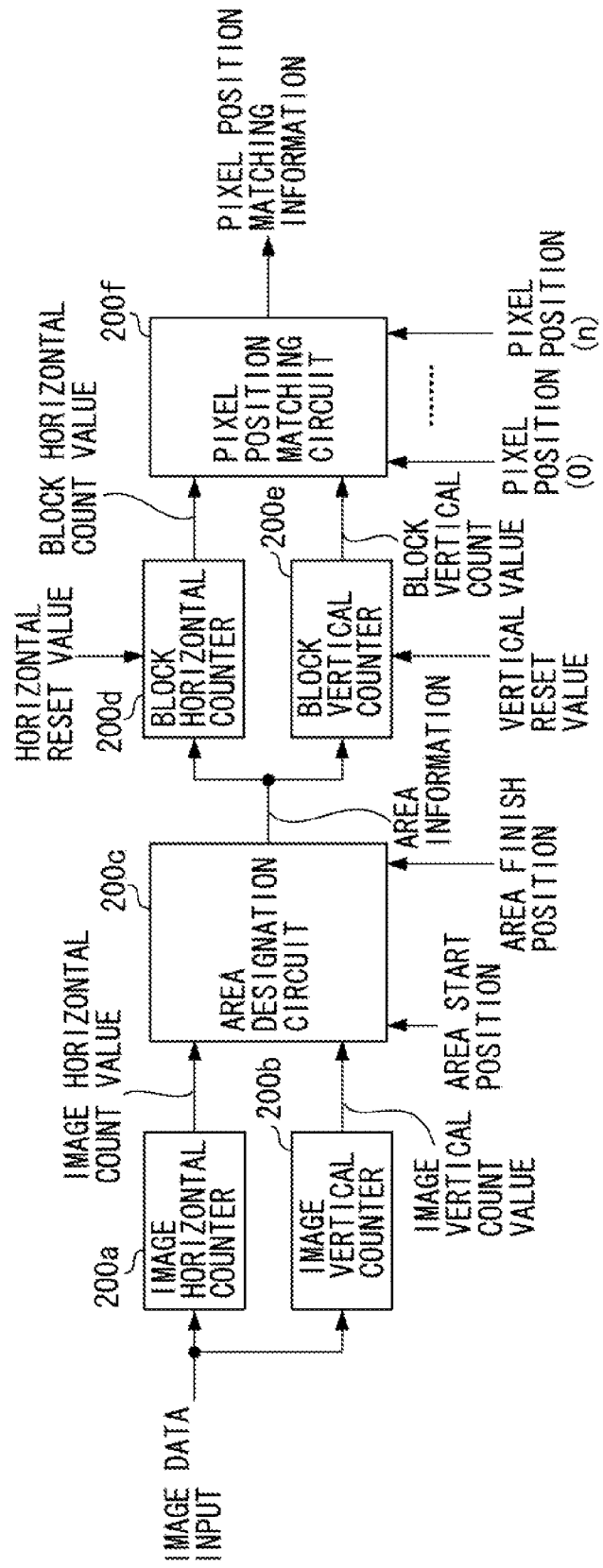

Operation of the pixel position designation circuit 200 will now be described. FIG. 10B illustrates a configuration of the pixel position designation circuit 200. The pixel position designation circuit 200 includes an image horizontal counter 200a that counts the number of pixels in the horizontal direction of the image, an image vertical counter 200b that counts the number of pixels in the vertical direction of the image, and an area designation circuit 200c. Area information indicating an area in which a specific pixel is present is output by referring to an image horizontal count value output from the image horizontal counter 200a, an image vertical count value output from the image vertical counter 200b, and an area start position and an area finish position set by the CPU 103. This area information is "1" if the position of the input image data is within an area designated by the area start position and area finish position, and is "0" if the position is not within that area. The pixel position designation circuit 200 also includes a block horizontal counter 200d and a block vertical counter 200e. If the focus area information output from the area designation circuit 200c is "1", the number of horizontal and vertical pixels are each counted. The block horizontal counter 200d resets the block horizontal count value at a predetermined period based on a horizontal reset value set by the CPU 103. Further, the block vertical counter 200e resets the block vertical count value at a predetermined period based on a vertical reset value set by the CPU 103. Based on this operation, the area is divided into areas (blocks) having a predetermined size. A pixel position matching circuit 200f refers to the block horizontal count value, the block vertical count value, and a plurality of pixel positions set by the CPU 103. The pixel position includes information about the horizontal position and the vertical position in the block. If the block horizontal count value and the block vertical count value match any of the pixel positions, "1" is output as the pixel position matching information. If there is no match, "0" is output. In the present exemplary embodiment, although the specific pixel is a pixel for focusing, naturally, the specific pixel may be employed for some other application. In the present exemplary embodiment, the settings of the pixel position designation circuit 200 that are performed in each operation mode are similar to those performed in the area designation circuit 108f, the block horizontal counter 108g, the block vertical counter 108h, and the pixel position matching circuit 108i in the first exemplary embodiment. Consequently, when m-th line data included therein the correction target pixel is input, the position of the focusing pixels in the image data at the m−1-th line and the m+1-th line can be notified of the flaw correction unit 201.

The flaw correction unit 201 can refer to the image data on the left and right of the correction target pixel by pipe line processing. The pixel position matching information output from the pixel position matching circuit 108i described in the first exemplary embodiment is input to the flaw correction unit 201, and whether the pixels on the left and right of the target pixel are a focusing pixel is notified.

The flaw correction unit 201 can refer to the image data to the left and right of the correction target pixel by pipe line processing. The pixel position matching information output from the pixel position matching circuit 108i described in the first exemplary embodiment is input to the flaw correction unit 201, and whether the pixels to the left and right of the target pixel are a focusing pixel is notified.

In the flaw correction unit 201, if the pixel position matching information output from the pixel position designation circuit 200 for the surrounding pixels for calculating the average value is "0", the average value is calculated using all of the surrounding pixels in the manner described above. On the other hand, if the pixel position matching information for the surrounding pixels is "1", those pixels are not included in the average value calculation. When the pixel data illustrated in FIG. 11B is input, the flaw correction target pixel is C5. If the pixel position matching information for pixel C7 is "1", the average value as the C5 correction value is the average value of C1, C2, C3, C4, C6, C8, and C9.

In the present exemplary embodiment, the example has been described in which a pixel having a designated position is excluded from the correction value calculation for flaw correction. However, if a pixel having the designated position is included in the pixels surrounding the target pixel when performing flaw correction, during calculation of the average value, processing may be performed based on a weighted average that reduces the weighting given to the pixel value of the specific pixel as compared with the other pixels. Further, during correction, processing may be added that, for example, excludes the specific pixel from the correction when the specific pixel is a flaw correction target pixel.

Thus, by performing flaw correction on an image by designating a focusing pixel position for each read operation mode, focusing pixel data that has different imaging pixels and output values can be applied in the correction value calculation, so that appropriate correction may be performed. Consequently, a good image may be provided.

A third exemplary embodiment will now be described. In the present exemplary embodiment, since the pixel value of a specific pixel is unsuitable as an output for the pixels configuring the image data of an actual image to be recorded, a configuration will be described that allows a pixel to function as a specific pixel during a series of imaging and recording processes even while the specific pixel is also serving as a flaw correction target. Further, in the present exemplary embodiment, a configuration is employed in which marking is performed on the image data using flaw information, and flaw correction processing is performed by a below-described flaw correction circuit 108c' based on the marking information.

Figure 13:
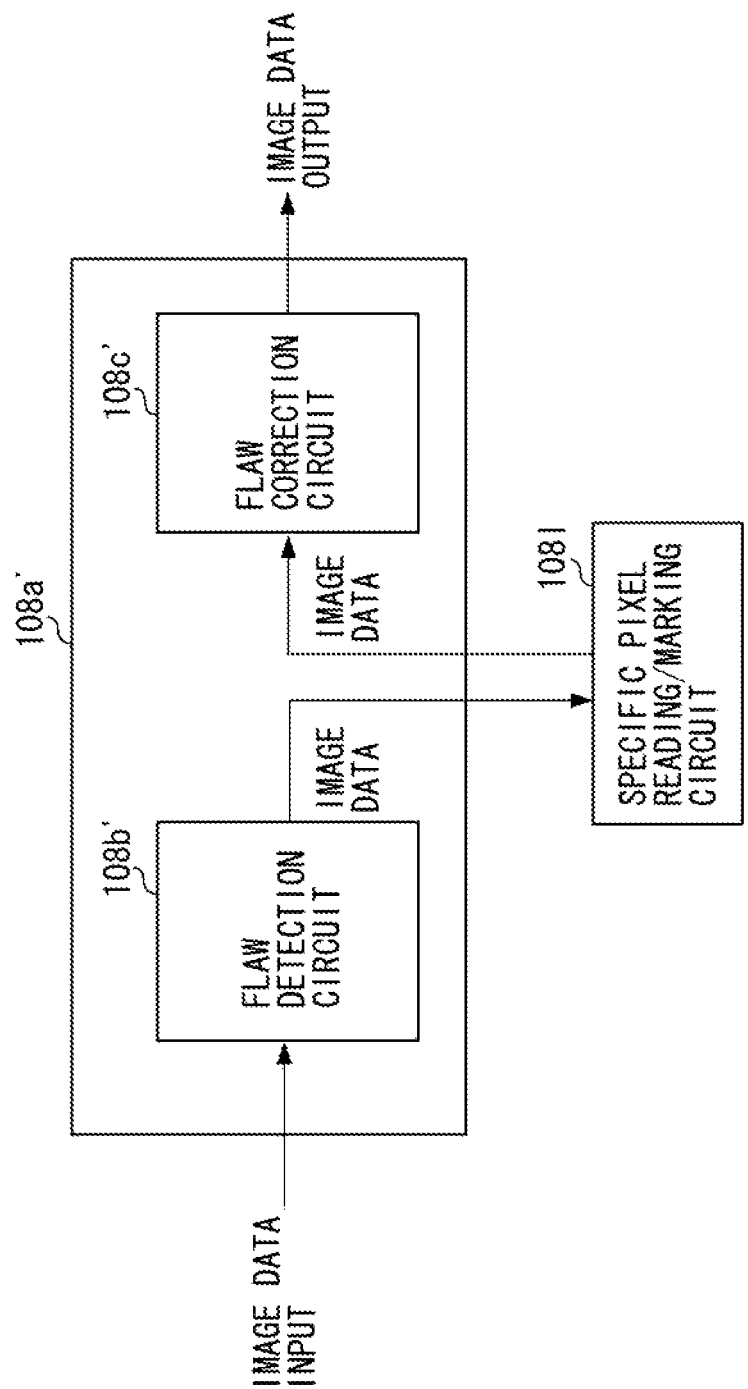
FIG. 13 illustrates a configuration example of a flaw processing circuit according to a third exemplary embodiment.

Since the configuration of the image capture apparatus according to the present exemplary embodiment is the same as the image capture apparatus described in the first exemplary embodiment, a description of the configuration will not be repeated here. Further, the operations of the image capture apparatus from imaging to recording are also basically performed based on the flow similar to the first exemplary embodiment. The processing different from the first exemplary embodiment is the flaw detection processing and the flaw correction processing, and the unit for realizing those is the flaw processing circuit 108a' illustrated in FIG. 13.

The image processing unit 108a' according to the present exemplary embodiment includes a flaw detection circuit 108b', a specific pixel reading/marking circuit 108l, and a flaw correction circuit 108c'. When the image data is input into the flaw processing circuit 108a', that data is input into the flaw detection circuit 108b'. Flawed pixels are detected from the image data by the flaw detection circuit 108b', and marking is performed on the image data to indicate that those pixels are a flaw. Specifically, rather than correcting the pixel value of the detected flawed pixels that are to be a target, a predetermined mark is made on the pixels to be subsequently recognized that those pixels are correction target pixels. In the present exemplary embodiment, this processing marks the target pixel value with a predetermined value (e.g., 0). Namely, in the present exemplary embodiment, image data in which the pixels detected as flaws have been marked is output from the flaw detection circuit 108b'. At this stage, similar to the flaw detection circuit 108b, the flaw detection circuit 108b' uses the pixel position matching information to make sure that the pixel at the specific pixel position is not marked. Further, the image data output from the flaw detection circuit 108b' is input to the specific pixel reading/marking circuit 108l. When the specific pixel has been read using the pixel position matching information in the similar manner as the flaw detection circuit 108b illustrated in FIG. 2B based on the pre-stored pixel position information about the specific pixel position, the specific pixel reading/marking circuit 108*l* performs marking on the read image data.

Unlike the image data that is input to the flaw correction circuit 108*c* in the other exemplary embodiments described above, in the flaw correction circuit 108*c'*, image data is input that has been marked with the predetermined marking at the flawed pixel positions and the specific pixel position. Therefore, in the flaw correction circuit 108*c'*, the pixel value of the pixels that have been marked with the predetermined marking is generated using a pixel value generated by interpolating the pixel values of the surrounding pixels.

Operation of the image capture apparatus according to the present exemplary embodiment will now be described with reference to FIG. 4. A description of steps and processes that are the same as those in the above-described embodiments is not repeated here.

In step S101, a setting for designating a focusing pixel position is performed in the specific pixel reading/marking circuit 108*l* based on the method similar to that described in the other exemplary embodiments. Next, in step S102, the CPU 103 starts reading of image data. The image data read from the image sensor is input to the image processing unit 108 in the manner similar to that in the other exemplary embodiments, and input to the flaw detection circuit 108*b'*. Image data that has been marked in the flawed pixel positions based on the method described above is output from the flaw detection circuit 108*b'* to the specific pixel reading/marking circuit 108*l*. At the specific pixel reading/marking circuit 108*l*, the pixel value of the specific pixel is read, and output to the AF calculation unit 110. In step S103, the amount of focus deviation is calculated by performing a predetermined calculation using the pixel value of the specific pixel.

In step S104, the above-described flaw correction processing by the flaw correction circuit 108*c'* and other image processing are performed in the image processing unit 108, and the processed data is recorded as a moving image in the recording unit 109.

Thus, in the present exemplary embodiment, in a configuration for performing flaw correction by determining that a pixel is a correction target pixel by marking the pixel value of a flaw correction target pixel, marking of the specific pixel is performed by a circuit or step separately from the flaw detection result, and is performed before reading of the specific pixel. Consequently, a pixel can function as a specific pixel during a series of imaging and recording processes, even while the pixel value of the specific pixel is also serving as a flaw correction target.

According to the configuration of the present exemplary embodiment, rather than each operation mode separately having position information about all the focusing pixels, each operation mode includes as information a period of the focusing pixel positions. This may decrease data amount indicating the focusing pixel positions, and the memory for storing data.

Further, the position information about all the focusing pixels may be included in each operation mode. In addition, each mode, such as thinning, may include position information about the focusing pixels when reading all the pixels, and process and apply the position information, for example.

Although exemplary embodiments of the present invention has been described above, the exemplary embodiments of the present invention is not limited to this. Various modifications and changes may be made within the scope of the invention (Exemplary Embodiment of Focusing Using Focusing Pixels)

A configuration of focusing pixels used in the present exemplary embodiment will now be described. In the present exemplary embodiment, pixels that have been imparted with a pupil division function by decentering a sensitive area in a light receiving portion with respect to the optical axis of an on-chip microlens compared with the ordinary pixels are used as focusing pixels. Other than such pixels, pixels that have been imparted with the pupil division function by dividing the light receiving portion of some of the ordinary pixels into two may also be used as the focusing pixels.

Figure 12A:
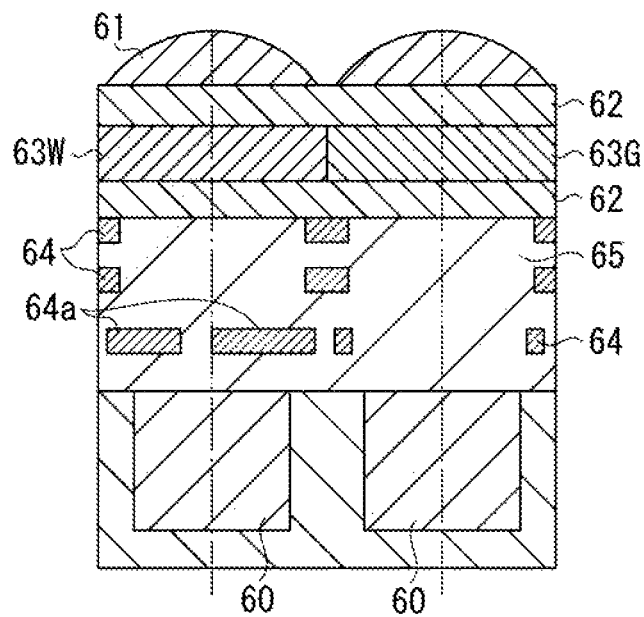
FIGS. 12A and 12B illustrate a configuration example of focusing pixels according to the first and second exemplary embodiments.
Figure 12B:
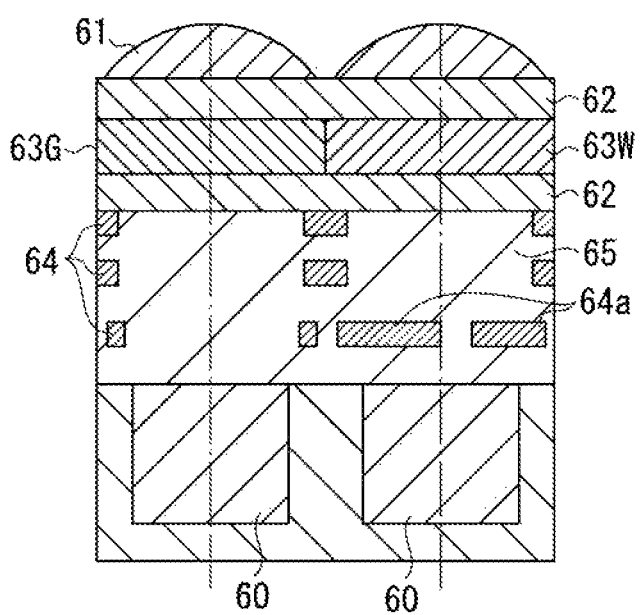

FIGS. 12A and 12B illustrate a configuration of the pixels included in an image sensor that has the pupil division function. An on-chip microlens efficiently collects light on a photoelectric conversion element 60. The configurations illustrated in FIGS. 12A and 12B also include a planarized film 62, a color filter 63, wires 64, and an interlayer insulating film 65.

FIG. 12A illustrates a focus detection pixel (the pixel on the left side), in which light sensitivity has a sensitivity peak in the right direction, and an ordinary pixel (the pixel on the right side). FIG. 12B illustrates an ordinary pixel (the pixel on the left side) and a focus detection pixel (the pixel on the right side), in which light sensitivity has a sensitivity peak in the left direction. In FIG. 12A, the pixel is provided with a sensitivity-peak pupil division function in the right direction by shifting the aperture of the bottommost wiring layer 64*a* to the left. In FIG. 12B, the pixel is provided with a sensitivity-peak pupil division function in the left direction by shifting the aperture of the bottommost wiring layer 64*a* to the right. Further, to increase the light amount, a color filter 63W of the focus detection pixel portion includes a transparent layer. In the present exemplary embodiment, if the focus detection pixel (pixel on the left side) whose light sensitivity has a sensitivity peak in the right direction and the focus detection pixel (pixel on the right side) whose light sensitivity has a sensitivity peak in the left direction are an A image and a B image, respectively, a focus deviation amount (a defocus amount) is calculated based on a phase difference detection signal between the A image and B image pair. The rear lens group 116 is moved based on the calculated focus deviation amount to perform focus adjustment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-090365 filed Apr. 11, 2012, which is hereby incorporated by reference herein in its entirety.

What is claimed is:

1. An image capture apparatus, comprising:
   an image sensor in which a plurality of types of pixels including an imaging pixel and a focusing pixel is arranged;
   a flaw detection circuit configured to detect a defective pixel based on a pixel value of each pixel in the image sensor; and
   flaw information generation circuit configured to output first information indicating the defective pixel based on a detecting result from the flaw detection circuit and second information indicating a position of the focusing pixel in the image sensor,
   wherein the flaw information generation circuit outputs the first information according to the defective pixel detected by the flaw detection circuit, in a case where a position of the defective pixel detected by the flaw detection circuit doesn't match the position of the focusing pixel indicated by the second information, and doesn't output the first information according to the defective pixel detected by the flaw detection circuit, in a case where the position of the defective pixel detected by the flaw detection circuit matches the position of the focusing pixel indicated by the second information.

2. The image capture apparatus according to claim 1, wherein the flaw detection circuit is configured to detect the defective pixels based on a difference between a representative value, which is obtained from a pixel value of a detection target pixel and a pixel value of pixels surrounding the detection target pixel, and a pixel value of the detection target pixel.

3. The image capture apparatus according to claim 2, wherein the flaw detection circuit is configured not to use the pixel value of the focusing pixel based on the second information when determining the representative value.

4. The image capture apparatus according to claim 2, wherein the flaw detection circuit is configured to determine the representative value by weight-averaging the pixel value of the detection target pixel and the pixel value of the pixels surrounding the detection target pixel, and to reduce a weighting of the pixel value of the focusing pixel compared with the pixels other than the focusing pixel based on the second information.

5. The image capture apparatus according to claim 1, further comprising a flaw correction circuit configured to correct the pixel value of the defective pixel based on the first information.

6. The image capture apparatus according to claim 5, wherein the flaw correction circuit is configured to calculate a correction value for correcting a correction target pixel based on an average value obtained from the pixel value of the pixels surrounding the defective pixel.

7. The image capture apparatus according to claim 6, wherein the flaw correction circuit is configured not to use the pixel value of the focusing pixel in the calculation of the correction value based on the second information when determining the average value.

8. The image capture apparatus according to claim 6, wherein the flaw correction circuit is configured to calculate the average value by giving a lower weighting to the pixel value of the focusing pixel than the pixels other than the focusing pixel based on the second information when determining the average value.

9. The image capture apparatus according to claim 1, further comprising:
   a CPU configured to perform focusing based on a pixel value of the focusing pixel.

10. The image capture apparatus according to claim 9, further comprising:
    an image processing unit configured to process image data output from the flaw correction circuit; and
    a recording unit configured to record on a recording medium image data that has been subjected to the image processing by the image processing unit.

11. A method for controlling an image capture apparatus that includes an image sensor, in which a plurality of types of pixels including an imaging pixel and a focusing pixel is arranged, the method comprising:
    detecting a defective pixel based on a pixel value of each pixel in the image sensor, and
    outputting first information indicating the defective pixel based on a detecting result and second information indicating a position of the focusing pixel in the image sensor,
    wherein:
    in a case where a position of the defective pixel does not match the position of the focusing pixel indicated by the second information, the first information is outputted, and
    in a case where the position of the defective pixel matches the position of the focusing pixel indicated by the second information, the first information is not outputted.

12. A non-transitory computer-readable medium storing a program that causes a computer to execute the method according to claim 11.

13. An image capture apparatus, comprising:
    an image sensor in which a plurality of types of pixels including an imaging pixel and a focusing pixel is arranged;
    a flaw detection circuit configured to detect a defective pixel based on a pixel value of each pixel in the image sensor; and
    a flaw correction circuit configured to correct a pixel value of the defective pixel based on a detecting result from the flaw detection circuit and second information indicating a position of the focusing pixel in the image sensor,
    wherein the flaw correction circuit corrects the value of the defective pixel detected by the flaw detection circuit, in a case where a position of the defective pixel detected by the flaw detection circuit doesn't match the position of the focusing pixel indicated by the second information, and doesn't correct the value of the defective pixel detected by the flaw detection circuit, in a case where the position of the defective pixel detected by the flaw detection circuit matches the position of the focusing pixel indicated by the second information.

14. A method for controlling an image capture apparatus that includes an image sensor, in which a plurality of types of pixels including an imaging pixel and a focusing pixel is arranged;
    detecting a defective pixel based on a pixel value of each pixel in the image sensor; and
    correcting a pixel value of the defective pixel based on the detection of the defective pixel and second information indicating a position of the focusing pixel in the image sensor,
    wherein:
    in a case where a position of the defective pixel detected by the flaw detection circuit doesn't match the position of the focusing pixel indicated by the second information, correcting the value of the defective pixel, and in a case where the position of the defective pixel detected by the flaw detection circuit matches the position of the focusing pixel indicated by the second information, does not correct the value of the defective pixel detected by the flaw detection circuit.

15. A non-transitory computer-readable medium storing a program that causes a computer to execute the method according to claim 14.

* * * * *